United States Patent
Alshourbagy et al.

(10) Patent No.: US 10,345,031 B2
(45) Date of Patent: *Jul. 9, 2019

(54) SPLIT HYBRID INSULATION STRUCTURE FOR AN APPLIANCE

(71) Applicant: WHIRLPOOL CORPORATION, Benton Harbor, MI (US)

(72) Inventors: Mohamed Alshourbagy, Stevensville, MI (US); Andrea Olivani, Cassinetta (IT); Ian Osborn, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,553

(22) Filed: Aug. 23, 2018

(65) Prior Publication Data

US 2018/0363973 A1  Dec. 20, 2018

Related U.S. Application Data

(60) Division of application No. 15/254,519, filed on Sep. 1, 2016, now Pat. No. 10,088,220, which is a
(Continued)

(51) Int. Cl.
*F25D 23/06* (2006.01)
*F25D 23/08* (2006.01)
(Continued)

(52) U.S. Cl.
CPC ............ *F25D 23/061* (2013.01); *F25D 11/00* (2013.01); *F25D 23/04* (2013.01); *F25D 23/065* (2013.01);
(Continued)

(58) Field of Classification Search
CPC ........ F25D 23/00; F25D 23/003; F25D 23/06; F25D 23/061; F25D 23/062;
(Continued)

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

OTHER PUBLICATIONS

Cai et al., "Generation of Metal Nanoparticles by Laser Ablation of Microspheres," J. Aerosol Sci., vol. 29, No. 5/6 (1998), pp. 627-636.
(Continued)

*Primary Examiner* — Andrew M Roersma
(74) *Attorney, Agent, or Firm* — Price Heneveld LLP

(57) ABSTRACT

An insulation structure for an appliance includes a first vacuum insulated structure having a top and downward sides extending from the top and defining a lower connection surface. A second vacuum insulated structure having a bottom and upward sides extending from the bottom and defining an upper connection surface, and an intermediate insulation structure having a top surface and a bottom surface, wherein the top surface engages the lower connection surface of the first vacuum insulated structure to define the first insulated interior, wherein the bottom surface engages the upper connection surface of the second vacuum insulated structure to define the second insulated interior, and wherein the intermediate insulation structure includes an appliance utility path within which at least one utility for the appliance is disposed.

16 Claims, 6 Drawing Sheets

Related U.S. Application Data continuation of application No. 14/789,303, filed on Jul. 1, 2015, now Pat. No. 9,441,779.

(51) Int. Cl.
  *F25D 11/00* (2006.01)
  *F25D 23/04* (2006.01)
  *F25D 25/02* (2006.01)

(52) U.S. Cl.
  CPC ......... *F25D 23/066* (2013.01); *F25D 23/069* (2013.01); *F25D 23/08* (2013.01); *F25D 25/025* (2013.01); *F25D 23/063* (2013.01); *F25D 2201/12* (2013.01); *F25D 2201/14* (2013.01); *F25D 2323/121* (2013.01); *F25D 2400/40* (2013.01)

(58) Field of Classification Search
  CPC .... F25D 23/063; F25D 23/065; F25D 23/068; F25D 23/069; F25D 2201/00; F25D 2201/10; F25D 2201/12; F25D 2201/14; F25D 2317/0653; F25D 2317/0654; F25D 2317/0663; F25D 2317/0665; F25D 2317/067; F25D 2323/002; F25D 2323/06; F25D 2400/04; F25D 2400/40
  See application file for complete search history.

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Costantini et al. |
| 3,137,900 A | 6/1964 | Carbary |
| 3,218,111 A | 11/1965 | Steiner |
| 3,258,883 A | 7/1966 | Louis et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherbum |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Cospey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |

(56) References Cited

U.S. PATENT DOCUMENTS

| | | | |
|---|---|---|---|
| 5,643,485 A | 7/1997 | Potter et al. | |
| 5,652,039 A | 7/1997 | Tremain et al. | |
| 5,716,581 A | 2/1998 | Tirrell | |
| 5,768,837 A | 6/1998 | Sjoholm | |
| 5,792,801 A | 8/1998 | Tsuda et al. | |
| 5,813,454 A | 9/1998 | Potter | |
| 5,826,780 A | 10/1998 | Nesser et al. | |
| 5,827,385 A | 10/1998 | Meyer et al. | |
| 5,834,126 A | 11/1998 | Sheu | |
| 5,843,353 A | 12/1998 | De Vos et al. | |
| 5,866,228 A | 2/1999 | Awata | |
| 5,866,247 A | 2/1999 | Klatt et al. | |
| 5,868,890 A | 2/1999 | Fredrick | |
| 5,900,299 A | 5/1999 | Wynne | |
| 5,918,478 A | 7/1999 | Bostic et al. | |
| 5,924,295 A | 7/1999 | Park | |
| 5,950,395 A | 9/1999 | Takemasa et al. | |
| 5,952,404 A | 9/1999 | Simpson et al. | |
| 5,966,963 A | 10/1999 | Kovalaske | |
| 5,985,189 A | 11/1999 | Lynn et al. | |
| 6,013,700 A | 1/2000 | Asano et al. | |
| 6,063,471 A | 5/2000 | Dietrich et al. | |
| 6,094,922 A | 8/2000 | Ziegler | |
| 6,109,712 A | 8/2000 | Haworth et al. | |
| 6,128,914 A | 10/2000 | Tamaoki et al. | |
| 6,132,837 A | 10/2000 | Boes et al. | |
| 6,158,233 A | 12/2000 | Cohen et al. | |
| 6,163,976 A | 12/2000 | Tada et al. | |
| 6,164,030 A | 12/2000 | Dietrich | |
| 6,164,739 A | 12/2000 | Schultz et al. | |
| 6,187,256 B1 | 2/2001 | Aslan et al. | |
| 6,209,342 B1 | 4/2001 | Banicevic et al. | |
| 6,210,625 B1 | 4/2001 | Matsushita et al. | |
| 6,220,473 B1 | 4/2001 | Lehman et al. | |
| 6,221,456 B1 | 4/2001 | Pogorski et al. | |
| 6,224,179 B1 * | 5/2001 | Wenning | F24C 15/34 |
| | | | 312/406 |
| 6,244,458 B1 | 6/2001 | Frysinger et al. | |
| 6,260,377 B1 | 7/2001 | Tamaoki et al. | |
| 6,266,970 B1 | 7/2001 | Nam et al. | |
| 6,294,595 B1 | 9/2001 | Tyagi et al. | |
| 6,305,768 B1 | 10/2001 | Nishimoto | |
| 6,485,122 B2 | 1/2002 | Wolf et al. | |
| 6,390,378 B1 | 5/2002 | Briscoe, Jr. et al. | |
| 6,406,449 B1 | 6/2002 | Moore et al. | |
| 6,408,841 B1 | 6/2002 | Hirath et al. | |
| 6,415,623 B1 | 7/2002 | Jennings et al. | |
| 6,428,130 B1 | 8/2002 | Banicevic et al. | |
| 6,430,780 B1 | 8/2002 | Kim et al. | |
| 6,460,955 B1 | 10/2002 | Vaughan et al. | |
| 6,519,919 B1 | 2/2003 | Takenouchi et al. | |
| 6,623,413 B1 | 9/2003 | Wynne | |
| 6,629,429 B1 | 10/2003 | Kawamura et al. | |
| 6,655,766 B2 | 12/2003 | Hodges | |
| 6,689,840 B1 | 2/2004 | Eustace et al. | |
| 6,716,501 B2 | 4/2004 | Kovalchuk et al. | |
| 6,736,472 B2 | 5/2004 | Banicevic | |
| 6,749,780 B2 | 6/2004 | Tobias | |
| 6,773,082 B2 | 8/2004 | Lee | |
| 6,858,280 B2 | 2/2005 | Allen et al. | |
| 6,860,082 B1 | 3/2005 | Yamamoto et al. | |
| 6,938,968 B2 | 9/2005 | Tanimoto et al. | |
| 7,008,032 B2 | 3/2006 | Chekal et al. | |
| 7,026,054 B2 | 4/2006 | Ikegawa et al. | |
| 7,197,792 B2 | 4/2007 | Moon | |
| 7,197,888 B2 | 4/2007 | LeClear et al. | |
| 7,207,181 B2 | 4/2007 | Murray et al. | |
| 7,210,308 B2 | 5/2007 | Tanimoto et al. | |
| 7,234,247 B2 | 6/2007 | Maguire | |
| 7,263,744 B2 | 9/2007 | Kim et al. | |
| 7,284,390 B2 | 10/2007 | Van Meter et al. | |
| 7,296,423 B2 | 11/2007 | Müller et al. | |
| 7,316,125 B2 * | 1/2008 | Uekado | F25D 23/062 |
| | | | 312/404 |
| 7,343,757 B2 | 3/2008 | Egan et al. | |
| 7,360,371 B2 | 4/2008 | Feinauer et al. | |
| 7,449,227 B2 | 11/2008 | Echigoya et al. | |
| 7,475,562 B2 | 1/2009 | Jackovin | |
| 7,517,031 B2 | 4/2009 | Laible | |
| 7,614,244 B2 | 11/2009 | Venkatakrishnan et al. | |
| 7,625,622 B2 | 12/2009 | Teckoe et al. | |
| 7,641,298 B2 | 1/2010 | Hirath et al. | |
| 7,665,326 B2 | 2/2010 | LeClear et al. | |
| 7,703,217 B2 | 4/2010 | Tada et al. | |
| 7,703,824 B2 | 4/2010 | Kittelson et al. | |
| 7,757,511 B2 | 7/2010 | LeClear et al. | |
| 7,762,634 B2 | 7/2010 | Tenra et al. | |
| 7,794,805 B2 | 9/2010 | Aumaugher et al. | |
| 7,815,269 B2 | 10/2010 | Wenning et al. | |
| 7,842,269 B2 | 11/2010 | Schachtely et al. | |
| 7,845,745 B2 | 12/2010 | Gorz et al. | |
| 7,861,538 B2 | 1/2011 | Welle et al. | |
| 7,886,559 B2 * | 2/2011 | Hell | F25D 23/063 |
| | | | 312/116 |
| 7,893,123 B2 | 2/2011 | Luisi | |
| 7,908,873 B1 | 3/2011 | Cur et al. | |
| 7,930,892 B1 | 4/2011 | Vonderhaar | |
| 7,938,148 B2 | 5/2011 | Carlier et al. | |
| 7,992,257 B2 | 8/2011 | Kim | |
| 8,049,518 B2 | 11/2011 | Wern et al. | |
| 8,074,469 B2 | 12/2011 | Hamel et al. | |
| 8,079,652 B2 | 12/2011 | Laible et al. | |
| 8,108,972 B2 | 2/2012 | Bae et al. | |
| 8,113,604 B2 | 2/2012 | Olson et al. | |
| 8,117,865 B2 | 2/2012 | Allard et al. | |
| 8,157,338 B2 | 4/2012 | Seo et al. | |
| 8,162,415 B2 | 4/2012 | Hagele et al. | |
| 8,163,080 B2 | 4/2012 | Meyer et al. | |
| 8,176,746 B2 | 5/2012 | Allard et al. | |
| 8,182,051 B2 | 5/2012 | Laible et al. | |
| 8,197,019 B2 | 6/2012 | Kim | |
| 8,202,599 B2 | 6/2012 | Henn | |
| 8,211,523 B2 | 7/2012 | Fujimori et al. | |
| 8,266,923 B2 | 9/2012 | Bauer et al. | |
| 8,281,558 B2 | 10/2012 | Hiemeyer et al. | |
| 8,299,656 B2 | 10/2012 | Allard et al. | |
| 8,343,395 B2 | 1/2013 | Hu et al. | |
| 8,353,177 B2 | 1/2013 | Adamski et al. | |
| 8,382,219 B2 | 2/2013 | Hottmann et al. | |
| 8,434,317 B2 | 5/2013 | Besore | |
| 8,439,460 B2 | 5/2013 | Laible et al. | |
| 8,456,040 B2 | 6/2013 | Allard et al. | |
| 8,491,070 B2 | 7/2013 | Davis et al. | |
| 8,516,845 B2 | 8/2013 | Wuesthoff et al. | |
| 8,528,284 B2 | 9/2013 | Aspenson et al. | |
| 8,590,992 B2 | 11/2013 | Lim et al. | |
| 8,717,029 B2 | 5/2014 | Chae et al. | |
| 8,739,568 B2 | 6/2014 | Allard et al. | |
| 8,752,918 B2 | 6/2014 | Kang | |
| 8,752,921 B2 | 6/2014 | Gorz et al. | |
| 8,763,847 B2 | 7/2014 | Mortarotti | |
| 8,764,133 B2 | 7/2014 | Park et al. | |
| 8,770,682 B2 | 7/2014 | Lee et al. | |
| 8,776,390 B2 | 7/2014 | Hanaoka et al. | |
| 8,840,204 B2 | 9/2014 | Bauer et al. | |
| 8,852,708 B2 | 10/2014 | Kim et al. | |
| 8,881,398 B2 | 11/2014 | Hanley et al. | |
| 8,905,503 B2 | 12/2014 | Sahasrabudhe et al. | |
| 8,943,770 B2 | 2/2015 | Sanders et al. | |
| 8,944,541 B2 | 2/2015 | Allard et al. | |
| 9,009,969 B2 | 4/2015 | Choi et al. | |
| RE45,501 E | 5/2015 | Maguire | |
| 9,056,952 B2 | 6/2015 | Eilbracht et al. | |
| 9,074,811 B2 | 7/2015 | Korkmaz | |
| 9,080,808 B2 | 7/2015 | Choi et al. | |
| 9,102,076 B2 | 8/2015 | Doshi et al. | |
| 9,103,482 B2 | 8/2015 | Fujimori et al. | |
| 9,125,546 B2 | 9/2015 | Kleemann et al. | |
| 9,140,480 B2 | 9/2015 | Kuehl et al. | |
| 9,140,481 B2 | 9/2015 | Cur et al. | |
| 9,170,045 B2 | 10/2015 | Oh et al. | |
| 9,170,046 B2 | 10/2015 | Jung et al. | |
| 9,188,382 B2 | 11/2015 | Kim et al. | |
| 8,955,352 B2 | 12/2015 | Lee et al. | |

(56) References Cited

U.S. PATENT DOCUMENTS

| | | | |
|---|---|---|---|
| 9,221,210 B2 | 12/2015 | Wu et al. | |
| 9,228,386 B2 | 1/2016 | Thielmann et al. | |
| 9,267,727 B2 | 2/2016 | Lim et al. | |
| 9,303,915 B2 | 4/2016 | Kim et al. | |
| 9,328,951 B2 | 5/2016 | Shin et al. | |
| 9,353,984 B2 | 5/2016 | Kim et al. | |
| 9,410,732 B2 | 8/2016 | Choi et al. | |
| 9,423,171 B2 | 8/2016 | Betto et al. | |
| 9,429,356 B2 | 8/2016 | Kim et al. | |
| 9,441,779 B1 * | 9/2016 | Alshourbagy | F25D 23/08 |
| 9,448,004 B2 | 9/2016 | Kim et al. | |
| 9,463,917 B2 | 10/2016 | Wu et al. | |
| 9,482,463 B2 | 11/2016 | Choi et al. | |
| 9,506,689 B2 | 11/2016 | Carbajal et al. | |
| 9,518,777 B2 | 12/2016 | Lee et al. | |
| 9,568,238 B2 | 2/2017 | Kim et al. | |
| D781,641 S | 3/2017 | Incukur | |
| D781,642 S | 3/2017 | Incukur | |
| 9,605,891 B2 | 3/2017 | Lee et al. | |
| 9,696,085 B2 | 7/2017 | Seo et al. | |
| 9,702,621 B2 | 7/2017 | Cho et al. | |
| 9,759,479 B2 | 9/2017 | Ramm et al. | |
| 9,777,958 B2 | 10/2017 | Choi et al. | |
| 9,791,204 B2 | 10/2017 | Kim et al. | |
| 9,833,942 B2 | 12/2017 | Wu et al. | |
| 10,088,220 B2 * | 10/2018 | Alshourbagy | F25D 23/08 |
| 2002/0004111 A1 | 1/2002 | Matsubara et al. | |
| 2002/0114937 A1 | 8/2002 | Albert et al. | |
| 2002/0144482 A1 | 10/2002 | Henson et al. | |
| 2002/0168496 A1 | 11/2002 | Morimoto et al. | |
| 2003/0008100 A1 | 1/2003 | Horn | |
| 2003/0041612 A1 | 3/2003 | Piloni et al. | |
| 2003/0056334 A1 | 3/2003 | Finkelstein | |
| 2003/0157284 A1 | 8/2003 | Tanimoto et al. | |
| 2003/0167789 A1 | 9/2003 | Tanimoto et al. | |
| 2003/0173883 A1 | 9/2003 | Koons | |
| 2004/0144130 A1 | 7/2004 | Jung | |
| 2004/0178707 A1 | 9/2004 | Avendano et al. | |
| 2004/0180176 A1 | 9/2004 | Rusek | |
| 2004/0226141 A1 | 11/2004 | Yates et al. | |
| 2004/0253406 A1 | 12/2004 | Hayashi et al. | |
| 2005/0042247 A1 | 2/2005 | Gomoll et al. | |
| 2005/0229614 A1 | 10/2005 | Ansted | |
| 2005/0235682 A1 | 10/2005 | Hirai et al. | |
| 2006/0064846 A1 | 3/2006 | Espendola et al. | |
| 2006/0076863 A1 | 4/2006 | Echigoya et al. | |
| 2006/0201189 A1 | 9/2006 | Adamski et al. | |
| 2006/0261718 A1 | 11/2006 | Miseki et al. | |
| 2006/0263571 A1 | 11/2006 | Tsunetsugu et al. | |
| 2006/0266075 A1 | 11/2006 | Itsuki et al. | |
| 2007/0001563 A1 | 1/2007 | Park et al. | |
| 2007/0099502 A1 | 5/2007 | Ferinauer et al. | |
| 2007/0176526 A1 | 8/2007 | Gomoll et al. | |
| 2007/0266654 A1 | 11/2007 | Noale | |
| 2008/0044488 A1 | 2/2008 | Zimmer et al. | |
| 2008/0048540 A1 | 2/2008 | Kim | |
| 2008/0138458 A1 | 6/2008 | Ozasa et al. | |
| 2008/0196441 A1 | 8/2008 | Ferreira et al. | |
| 2008/0300356 A1 | 12/2008 | Meyer et al. | |
| 2008/0309210 A1 | 12/2008 | Luisi et al. | |
| 2009/0032541 A1 | 2/2009 | Rogala et al. | |
| 2009/0056367 A1 | 3/2009 | Nuemann | |
| 2009/0058244 A1 | 3/2009 | Cho et al. | |
| 2009/0113925 A1 | 5/2009 | Korkmaz | |
| 2009/0131571 A1 | 5/2009 | Fraser et al. | |
| 2009/0179541 A1 | 7/2009 | Smith et al. | |
| 2009/0205357 A1 | 8/2009 | Lim et al. | |
| 2009/0302728 A1 | 12/2009 | Rotter et al. | |
| 2009/0322470 A1 | 12/2009 | Yoo et al. | |
| 2009/0324871 A1 | 12/2009 | Henn | |
| 2010/0170279 A1 | 7/2010 | Aoki | |
| 2010/0206464 A1 | 8/2010 | Heo et al. | |
| 2010/0218543 A1 | 9/2010 | Ducharme | |
| 2010/0231109 A1 | 9/2010 | Matzke et al. | |
| 2010/0287843 A1 | 11/2010 | Oh | |
| 2010/0287974 A1 | 11/2010 | Cur et al. | |
| 2010/0293984 A1 | 11/2010 | Adamski et al. | |
| 2010/0295435 A1 | 11/2010 | Kendall et al. | |
| 2011/0011119 A1 | 1/2011 | Kuehl et al. | |
| 2011/0023527 A1 | 2/2011 | Kwon et al. | |
| 2011/0030894 A1 | 2/2011 | Tenra et al. | |
| 2011/0095669 A1 | 4/2011 | Moon et al. | |
| 2011/0146325 A1 | 6/2011 | Lee | |
| 2011/0146335 A1 | 6/2011 | Jung et al. | |
| 2011/0165367 A1 | 7/2011 | Kojima et al. | |
| 2011/0215694 A1 | 9/2011 | Fink et al. | |
| 2011/0220662 A1 | 9/2011 | Kim et al. | |
| 2011/0241513 A1 | 10/2011 | Nomura et al. | |
| 2011/0241514 A1 | 10/2011 | Nomura et al. | |
| 2011/0260351 A1 | 10/2011 | Corradi et al. | |
| 2011/0290808 A1 | 12/2011 | Bai et al. | |
| 2011/0309732 A1 | 12/2011 | Horil et al. | |
| 2011/0315693 A1 | 12/2011 | Cur et al. | |
| 2012/0000234 A1 | 1/2012 | Adamski et al. | |
| 2012/0011879 A1 | 1/2012 | Gu | |
| 2012/0060544 A1 | 3/2012 | Lee et al. | |
| 2012/0099255 A1 | 4/2012 | Lee et al. | |
| 2012/0103006 A1 | 5/2012 | Jung et al. | |
| 2012/0104923 A1 | 5/2012 | Jung et al. | |
| 2012/0118002 A1 | 5/2012 | Kim et al. | |
| 2012/0137501 A1 | 6/2012 | Allard et al. | |
| 2012/0152151 A1 | 6/2012 | Meyer et al. | |
| 2012/0196059 A1 | 8/2012 | Fujimori et al. | |
| 2012/0231204 A1 | 9/2012 | Jeon et al. | |
| 2012/0237715 A1 | 9/2012 | McCraken | |
| 2012/0240612 A1 | 9/2012 | Wusthoff et al. | |
| 2012/0273111 A1 | 11/2012 | Nomura et al. | |
| 2012/0279247 A1 | 11/2012 | Katu et al. | |
| 2012/0280608 A1 | 11/2012 | Park et al. | |
| 2012/0285971 A1 | 11/2012 | Junge et al. | |
| 2012/0297813 A1 | 11/2012 | Hanley et al. | |
| 2012/0324937 A1 | 12/2012 | Adamski et al. | |
| 2013/0026900 A1 | 1/2013 | Oh et al. | |
| 2013/0033163 A1 | 2/2013 | Kang | |
| 2013/0043780 A1 | 2/2013 | Ootsuka et al. | |
| 2013/0068990 A1 | 3/2013 | Eilbracht et al. | |
| 2013/0111941 A1 | 5/2013 | Yu et al. | |
| 2013/0221819 A1 | 8/2013 | Wing | |
| 2013/0255304 A1 | 10/2013 | Cur et al. | |
| 2013/0256318 A1 | 10/2013 | Kuehl et al. | |
| 2013/0256319 A1 | 10/2013 | Kuehl et al. | |
| 2013/0257256 A1 | 10/2013 | Allard et al. | |
| 2013/0257257 A1 | 10/2013 | Cur et al. | |
| 2013/0264439 A1 | 10/2013 | Allard et al. | |
| 2013/0270732 A1 | 10/2013 | Wu et al. | |
| 2013/0285527 A1 | 10/2013 | Choi et al. | |
| 2013/0293080 A1 | 11/2013 | Kim et al. | |
| 2013/0305535 A1 | 11/2013 | Cur et al. | |
| 2013/0328472 A1 | 12/2013 | Shim et al. | |
| 2014/0009055 A1 | 1/2014 | Cho et al. | |
| 2014/0097733 A1 | 4/2014 | Seo et al. | |
| 2014/0132144 A1 | 5/2014 | Kim et al. | |
| 2014/0166926 A1 | 6/2014 | Lee et al. | |
| 2014/0171578 A1 | 6/2014 | Meyer et al. | |
| 2014/0190978 A1 | 7/2014 | Bowman et al. | |
| 2014/0196305 A1 | 7/2014 | Smith | |
| 2014/0216706 A1 | 8/2014 | Melton et al. | |
| 2014/0232250 A1 | 8/2014 | Kim et al. | |
| 2014/0260332 A1 | 9/2014 | Wu | |
| 2014/0346942 A1 | 11/2014 | Kim et al. | |
| 2014/0364527 A1 | 12/2014 | Wintermantel et al. | |
| 2015/0011668 A1 | 1/2015 | Kolb et al. | |
| 2015/0015133 A1 | 1/2015 | Carbajal et al. | |
| 2015/0017386 A1 | 1/2015 | Kolb et al. | |
| 2015/0027628 A1 | 1/2015 | Cravens et al. | |
| 2015/0059399 A1 | 3/2015 | Hwang et al. | |
| 2015/0115790 A1 | 4/2015 | Ogg | |
| 2015/0147514 A1 | 5/2015 | Shinohara et al. | |
| 2015/0159936 A1 | 6/2015 | Oh et al. | |
| 2015/0168050 A1 | 6/2015 | Cur et al. | |
| 2015/0176888 A1 | 6/2015 | Cur et al. | |
| 2015/0184923 A1 | 7/2015 | Jeon | |
| 2015/0190840 A1 | 7/2015 | Muto et al. | |
| 2015/0224685 A1 | 8/2015 | Amstutz | |

(56) References Cited

U.S. PATENT DOCUMENTS

| | | |
|---|---|---|
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 9/1997 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 12/2011 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 204963379 | 1/2016 |
| DE | 1150190 | 6/1963 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0480451 | 4/1992 |
| EP | 0645576 A1 | 3/1995 |
| EP | 0691518 | 1/1996 |
| EP | 0260699 | 3/1998 |
| EP | 0860669 | 8/1998 |
| EP | 1087186 | 3/2001 |
| EP | 1200785 | 5/2002 |
| EP | 1243880 | 9/2002 |
| EP | 1484563 | 12/2004 |
| EP | 1496322 | 1/2005 |
| EP | 1505359 | 2/2005 |
| EP | 1602425 A1 | 12/2005 |
| EP | 1624263 A2 | 8/2006 |
| EP | 2342511 | 7/2011 |
| EP | 2543942 A2 | 1/2013 |
| EP | 2607073 | 6/2013 |
| EP | 2789951 | 10/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 12/1970 |
| JP | S4828353 | 8/1973 |
| JP | S5157777 | 5/1976 |
| JP | S59191588 | 12/1984 |
| JP | 04165197 | 6/1992 |
| JP | 04165197 | 10/1992 |
| JP | 04309778 A | 11/1992 |
| JP | H06159922 | 6/1994 |
| JP | H071479 | 1/1995 |
| JP | H07167377 | 7/1995 |
| JP | H08300052 | 11/1996 |
| JP | H08303686 | 11/1996 |
| JP | H09166271 | 6/1997 |
| JP | H10113983 | 5/1998 |
| JP | 11159693 A | 6/1999 |
| JP | H11311395 | 11/1999 |
| JP | H11336990 | 12/1999 |
| JP | 2000097390 | 4/2000 |
| JP | 20000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 | 8/2003 |
| JP | 3478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006-77792 | 3/2006 |
| JP | 2006161834 A | 6/2006 |
| JP | 2006161945 | 6/2006 |
| JP | 3792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 4545126 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 4779684 | 9/2011 |
| JP | 2011196644 | 10/2011 |
| JP | 2012026493 | 2/2012 |
| JP | 4897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 20080103845 | 11/2008 |
| KR | 20090026045 | 3/2009 |
| KR | 101017776 | 2/2011 |
| KR | 20120007241 | 1/2012 |

(56) References Cited

FOREIGN PATENT DOCUMENTS

| | | |
|---|---|---|
| KR | 20120046621 | 5/2012 |
| KR | 20120051305 | 5/2012 |
| KR | 20150089495 A | 8/2015 |
| RU | 2061925 C1 | 6/1996 |
| RU | 2077411 C1 | 4/1997 |
| RU | 2081858 | 6/1997 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 547614 | 5/1977 |
| SU | 648780 A1 | 2/1979 |
| SU | 01307186 A1 | 4/1987 |
| WO | 9614207 A1 | 5/1996 |
| WO | 9721767 | 6/1997 |
| WO | 1998049506 | 11/1998 |
| WO | 9920961 A1 | 4/1999 |
| WO | 9920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 2003089729 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2012023705 | 2/2012 |
| WO | 2012026715 | 3/2012 |
| WO | 2012031885 | 3/2012 |
| WO | 2012043990 | 4/2012 |
| WO | 2012044001 | 4/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Raszewski et al., "Methods for Producing Hollow Glass Microspheres," Powerpoint, cached from Google, Jul. 2009, 6 pages.

* cited by examiner

SPLIT HYBRID INSULATION STRUCTURE FOR AN APPLIANCE

CROSS-REFERENCE TO RELATED APPLICATIONS

The present application is a divisional of U.S. patent application Ser. No. 15/254,519 filed Sep. 1, 2016, entitled SPLIT HYBRID INSULATION STRUCTURE FOR AN APPLIANCE, which is a continuation of U.S. patent application Ser. No. 14/789,303 filed Jul. 1, 2015, entitled SPLIT HYBRID INSULATION STRUCTURE FOR AN APPLIANCE, now U.S. Pat. No. 9,441,779, the entire disclosures of which are hereby incorporated herein by reference.

FIELD OF THE DEVICE

The device is in the field of insulation structures for appliances, more specifically, a multi-component hybrid insulation structure incorporating multiple insulation structures.

SUMMARY OF THE DISCLOSURE

In at least one aspect, an insulation structure for an appliance includes a first vacuum insulated structure having a top and at least one downward side extending from the top, a lower portion of the at least one downward side defining a lower connection surface. The top and the at least one downward side at least partially define a first insulated interior. A second vacuum insulated structure includes a bottom and at least one upward side extending from the bottom, an upper portion of the at least one upward side defining an upper connection surface. The bottom and the at least one upward side at least partially define a second insulated interior. An intermediate insulation structure includes a top surface and a bottom surface, wherein the top surface engages the lower connection surface of the first vacuum insulated structure to further define the first insulated interior, wherein the bottom surface engages the upper connection surface of the second vacuum insulated structure to further define the second insulated interior, and wherein the intermediate insulation structure includes an appliance utility path within which at least one utility for the appliance is disposed, and wherein the appliance utility path is in communication with the first and second insulated interiors.

In at least another aspect, a first vacuum insulated structure includes a plurality of continuous sides that define an open front, an open end and an engagement surface proximate the open end, wherein the continuous sides at least partially define a first insulated interior, and wherein the plurality of continuous sides is free of internal apertures through the first vacuum insulated structure. An intermediate insulation structure includes a first surface and a second surface, wherein one of the first and second surfaces receives the engagement surface to further define the first insulated interior. The intermediate insulation structure includes an appliance utility path within which at least one utility for the appliance is disposed, and wherein the appliance utility path is in communication with the first insulated interior.

In at least another aspect, a method for forming an insulation structure for an appliance includes disposing at least one utility system within the appliance utility path of the intermediate insulation structure, and engaging the lower connection surface of the first vacuum insulated structure with the top surface of the intermediate insulation structure to define the first insulated interior. The first insulated interior is in communication with the appliance utility path and the at least one utility. The method also includes engaging the upper connection surface of the second vacuum insulation structure with the bottom surface of the intermediate insulation structure to define the second insulated interior. The second insulated interior is in communication with the appliance utility path and the at least one utility. The engagement of the first and second vacuum insulated structures with the intermediate insulation structure forms a split hybrid insulation structure.

These and other features, advantages, and objects of the present device will be further understood and appreciated by those skilled in the art by reference to the following specification, claims, and appended drawings.

BRIEF DESCRIPTION OF THE DRAWINGS

The foregoing summary, as well as the following detailed description of the device, will be better understood when read in conjunction with the appended drawings. For the purpose of illustrating the device, there are shown in the drawings, certain embodiment(s) which are presently preferred. It should be understood, however, that the device is not limited to the precise arrangements and instrumentalities shown. Drawings are not necessary to scale.

Certain features of the device may be exaggerated in scale or shown in schematic form in the interest of clarity and conciseness.

DETAILED DESCRIPTION

Figure 1:
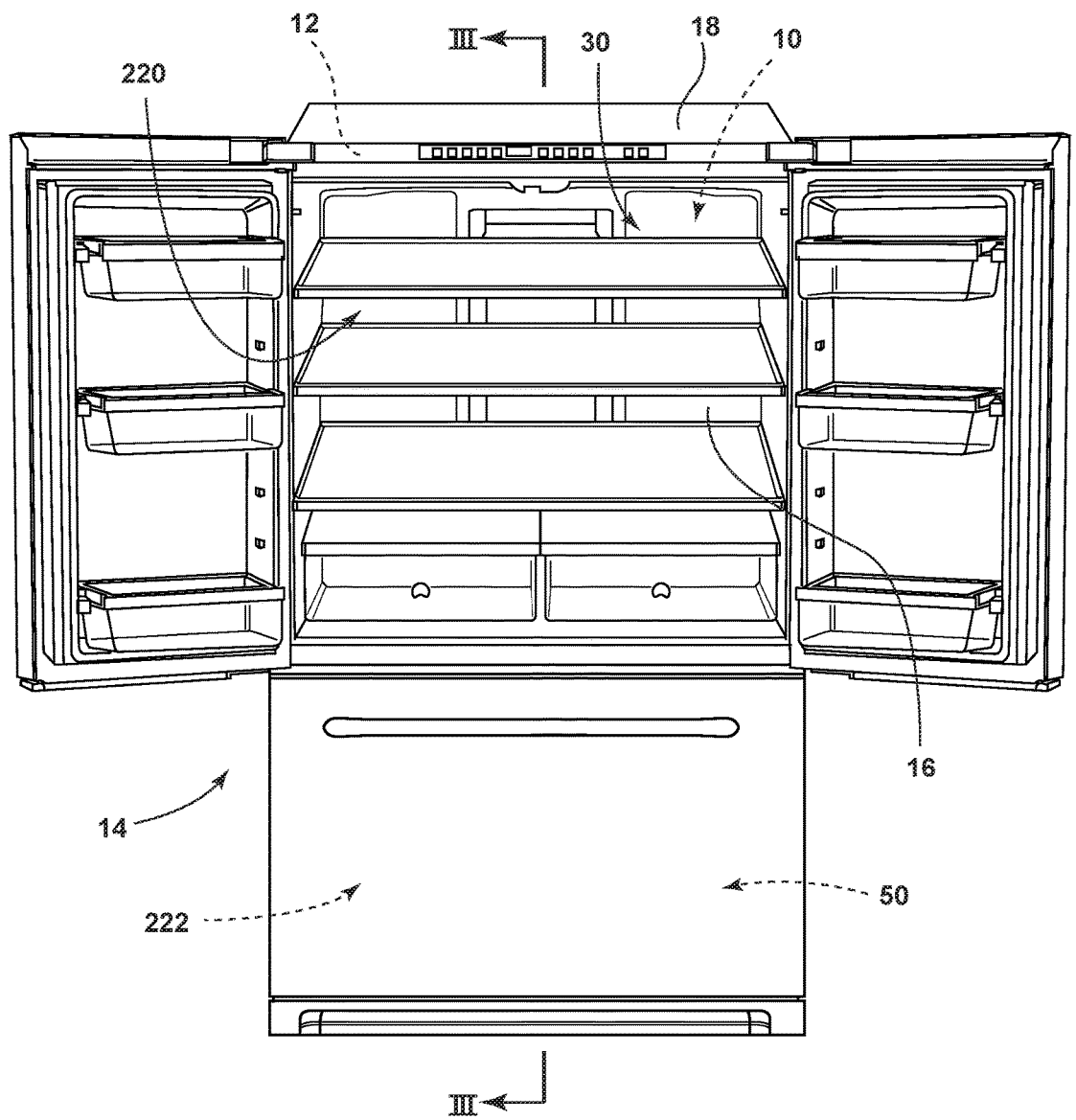
FIG. 1 is a front perspective view of a refrigerated appliance incorporating an embodiment of the split hybrid insulation structure and shown with the doors in an open position.

Before the subject device is described further, it is to be understood that the device is not limited to the particular embodiments of the device described below, as variations of the particular embodiments may be made and still fall within the scope of the appended claims. It is also to be understood that the terminology employed is for the purpose of describing particular embodiments or aspects of embodiments, and is not intended to be limiting. Instead, the scope of the present device will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the device. The upper and lower limits of these smaller ranges may independently be included in the smaller ranges, and are also encompassed within the device, subject to any specifically excluded limit in the stated range. Where the stated range includes one or both of the limits, ranges excluding either or both of those included limits are also included in the device.

In this specification and the appended claims, the singular forms "a," "an" and "the" include plural reference unless the context clearly dictates otherwise.

As illustrated in FIGS. 1-4, reference numeral 10 generally refers to a split hybrid insulation structure to be disposed within an insulation cavity 12 of an appliance 14 where the insulation cavity 12 is defined between an inner liner 16 and an outer wrapper 18 of the appliance 14. An insulation structure 10 for the appliance 14 includes a first vacuum insulated structure 20 having a top side 22 and at least one downward side 24 extending from the top side 22. A lower portion 26 of the at least one downward side 24 defines a lower connection surface 28. The top side 22 and the at least one downward side 24 at least partially define a first insulated interior 30. A second vacuum insulated structure 40 includes a bottom side 42 and at least one upward side 44 extending from the bottom side 42. An upper portion 46 of the at least one upward side 44 defines an upper connection surface 48, wherein the bottom side 42 and the at least one upward side 44 at least partially define a second insulated interior 50. An intermediate insulation structure 60 includes top and bottom surfaces 62, 64. The top surface 62 is configured to engage the lower connection surface 28 of the first vacuum insulated structure 20 to further define the first insulated interior 30. The bottom surface 64 of the intermediate insulation structure 60 is configured to engage the upper connection surface 48 of the second vacuum insulated structure 40 to further define the second insulated interior 50. The intermediate insulation structure 60 includes an appliance utility path 66 within which at least one utility system 68 for the appliance 14 is disposed. The appliance utility path 66 is configured to be in communication with the first and second insulated interiors 30, 50.

Referring again to FIGS. 2-5, the first and second vacuum insulated structures 20, 40 can be formed from an insulation material 80 disposed within a barrier film 82 and evacuated to create an at least partial, or more typically, substantially complete or complete vacuum within the barrier film 82. The outer surface 84 of the first and second vacuum insulated structures 20, 40 are hermetically sealed such that the at least partial vacuum or greater vacuum level defined within the interior 86 of the first and second vacuum insulated structures 20, 40 can be maintained throughout manufacture, assembly and use of the appliance 14. It is contemplated that the first and second vacuum insulated structures 20, 40 are manufactured such that the components of the first and second vacuum insulated structures 20, 40 are free or substantially free of apertures, openings, perforations, or other punctures defined through any of the surfaces of the first and second vacuum insulated structures 20, 40. Accordingly, the top and downward sides 22, 24 of the first vacuum insulated structure 20 and the connecting joints 88 therebetween and the bottom and upward sides 42, 44 of the second vacuum insulated structure 40 and connecting joints 88 therebetween form a continuous surface 90 that, as discussed above, is free of punctures, openings, apertures, and other discontinuities defined within the first and second vacuum insulated structures 20, 40.

According to the various alternate aspects of the disclosure, the at least one downward side 24 can include one or more downward sides 24, and typically, three sides. Similarly, the at least one upward side 44 can include one or more upward sides 44, and typically, three upward sides 44. Additional upward and/or downward sides 44, 24 may be included to provide for various utility systems 68 of the appliance 14.

Referring again to FIGS. 2-4, the intermediate insulation structure 60 can be formed from a conventional rigid foam insulation that is free of any outer wrapper 18 or other container. Accordingly, in various alternate aspects of the disclosure, it is contemplated that the lower connection surface 28 of the first vacuum insulated structure 20 and the upper connection surface 48 of the second vacuum insulated structure 40 directly engage the top and bottom surfaces 62, 64, respectively, of the intermediate insulation structure 60.

According to the various alternate aspects of the disclosure, the engagement between the intermediate insulating structure 60 and the first and second vacuum insulated structures 20, 40 can be a surface-to-surface engagement that is substantially free or free of fasteners, adhesives, welding or other connecting method. It is also contemplated that the lower connection surface 28 of the first vacuum-insulated structure 20 and/or the upper connection surface 48 of the second vacuum insulated structure 40 with the top and bottom surfaces 62, 64, respectively, of the intermediate insulating structure 60 can optionally include adhesives, fasteners, mechanical fastening mechanisms, interference mechanisms or other connecting methods beyond a surface-to-surface connection.

Figure 5:
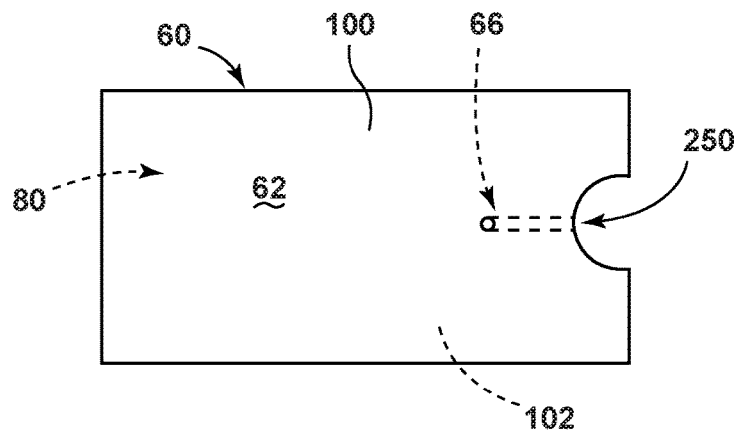
FIG. 5 is a top plan view of an aspect of an intermediate insulation structure for the split hybrid insulation system.

According to various alternate aspects of the disclosure, as exemplified in FIG. 5, the intermediate insulation structure 60 can include an intermediate cover member 100 that defines an internal mullion volume 102. In such an aspect of the disclosure, it is contemplated that an insulating material is disposed within the internal mullion volume 102. As will be described more fully below, the appliance utility path 66 is disposed within the intermediate insulation structure 60 such that the various utility systems 68 of the appliance 14 can be run through portions of the intermediate insulation structure 60. In this manner, the internal mullion volume 102 of the intermediate insulation structure 60 is made to be free or substantially free of any vacuum and is not, typically, hermetically sealed. Accordingly, the appliance utility path 66 defined within the intermediate insulation structure 60 provides a path through which the various utility systems 68 can be delivered to the first and second insulated interiors 30, 50 without having to pass through either the first and/or second vacuum insulated structures 20, 40. Therefore, the first and second vacuum insulated structures 20, 40 can be maintained in a continuous or substantially continuous configuration and free of internal openings, holes, or other punctures. In this manner, the first and second vacuum insulated structures 20, 40 are free, or substantially free, of direct engagement with the appliance utility path 66.

According to the various alternate aspects of the disclosure, manufacturing the first and second vacuum insulated structures 20, 40 to be free of openings, apertures, or other punctures can serve to simplify the process of making the first and second vacuum insulated structures 20, 40. Additionally, because the first and second vacuum insulated structures 20, 40 are made to be substantially free or free of discontinuous surfaces, the occurrence of imperfections in the hermetic seal of the barrier film 82 can be lessened, as fewer corners, edges, and interconnections are included within the first and second vacuum insulated structures 20, 40. It is also contemplated that the absence of openings, apertures, or other punctures within the first and second vacuum insulated structures 20, 40 can serve to increase the insulating performance of the first and second vacuum insulated structures 20, 40, thereby increasing the energy efficiency of the first and second insulated interiors 30, 50 in the appliance 14 as a whole.

According to various alternate aspects of the disclosure, the intermediate insulation structure 60 can include a non-vacuum insulated member through which the appliance utility path 66 can be run. It is also contemplated that at least a portion of the intermediate insulation structure 60 can be made from a vacuum insulated member to form an intermediate insulating structure 60 made from a plurality of components to form a composite structure. In such an aspect of the disclosure, the appliance utility path 66 can be run through a portion of the intermediate insulation structure 60 that is not placed under a vacuum. Such a composite construction can serve to minimize the amount of the split hybrid insulation structure 10 that is not placed under an at least partial or greater vacuum, while also minimizing the occurrence of apertures, openings, and other punctures within the various vacuum insulated structures of the split hybrid insulation structure 10.

Referring again to FIGS. 2-4, the upward sides 44 of the second vacuum insulated structure 40 can include a lower back wall 110 that extends upward from the bottom side 42 of the second vacuum insulated structure 40. It is contemplated that the lower back wall 110 can be set forward a predetermined distance relative to an upper back wall 112 of the first vacuum insulated structure 20. In such an aspect of the disclosure, a rear portion 114 of the intermediate insulation structure 60 extends rearward of the lower back wall 110 to define an interstitial space 116 defined between the lower back wall 110 and an outer wrapper 18 of the appliance 14. At least a portion of the appliance utility path 66 can be positioned within the rear portion 114 of the intermediate insulation structure 60 such that the appliance utility path 66 is in communication with the interstitial space 116. It is contemplated that at least a portion of the interstitial space 116 can include a machine compartment 118 for housing various mechanical features of the refrigerating appliance 14. Such mechanical features can include, but are not limited to, compressors, condensors, expansion devices, electrical features, water delivery systems, air handling units, and other similar mechanical fixtures. Accordingly, the various utility systems 68 of the appliance 14 can include at least one of an electrical system, a data system, a wireless communication system, a refrigeration system, a water or other liquid(s) system, an air handling system and other similar systems. It is contemplated that the interstitial space 116 defined between the lower back wall 110 and the outer wrapper 18 of the appliance 14 can extend downward from a portion of the bottom surface 64 of the intermediate insulation structure 60.

Referring again to FIGS. 2-4, the downward sides 24 of the first vacuum insulated structure 20 can include an upper back wall 112 that can engage or substantially engage the outer wrapper 18 of the appliance 14, such that the interstitial space 116 does not extend above or does not substantially extend above the intermediate insulation structure 60. According to various alternate aspects of the disclosure, the interstitial space 116 can extend both above and below the intermediate insulation structure 60 such that the upper back wall 112 and the lower back wall 110 of the first and second vacuum insulated structures 20, 40, respectively, can be at least partially offset from the outer wrapper 18 to define portions of the interstitial space 116 for housing the various utility systems 68 of the appliance 14.

Referring again to FIGS. 3 and 4, it is contemplated that the appliance utility path 66 of the intermediate insulation structure 60 can include a plurality of conduits that extend through portions of the intermediate insulation structure 60. In this manner, first and second conduits 130, 132 of the plurality of conduits can be placed in communication with the first and second insulated interiors 30, 50, respectively. According to the various alternate aspects of the disclosure, it is also contemplated that the first and second conduits 130, 132 of the appliance utility path 66 can be used to house various portions of the utility systems 68 of the appliance 14. In this manner, the utility systems 68 can be delivered from the machine compartment 118 within the interstitial space 116 and through the appliance utility path 66 for delivery to positions at least proximate the first and second insulated interiors 30, 50.

Referring again to FIGS. 3 and 4, it is contemplated that the inner liner 16 of the appliance 14 can be offset from portions of the first vacuum insulated structure 20, the second vacuum insulated structure 40, and/or the intermediate insulation structure 60. In this manner, the utility spaces 140 can be defined between the inner liner 16 and portions of the split hybrid insulation structure 10 for housing other portions of the various utility systems 68 of the appliance 14. By way of example, and not limitation, one or more of the utility spaces 140 defined between the inner liner 16 and the split hybrid insulation structure 10 can be used to house one or more evaporators and air handlers for delivering cooling to one of the first and second insulated interiors 30, 50. Such utility spaces 140 can also be used to house one or more water filters, ice makers, air handling ducts, user interface controls, electrical wiring, refrigeration lines, and other support systems and fixtures of the various utility systems 68 of the appliance 14.

Figure 2:
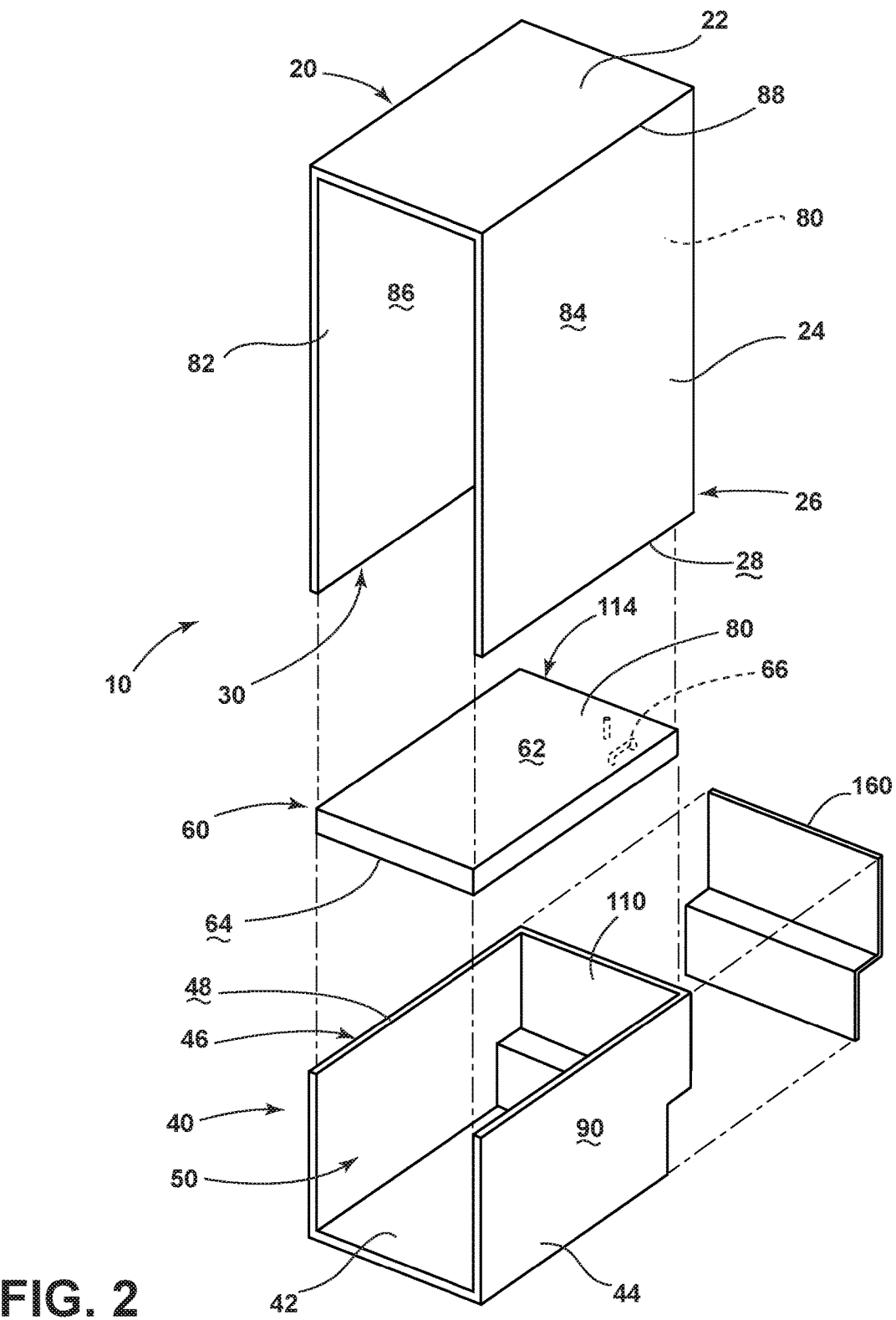
FIG. 2 is an exploded perspective view of an aspect of the split hybrid insulation structure.
Figure 3:
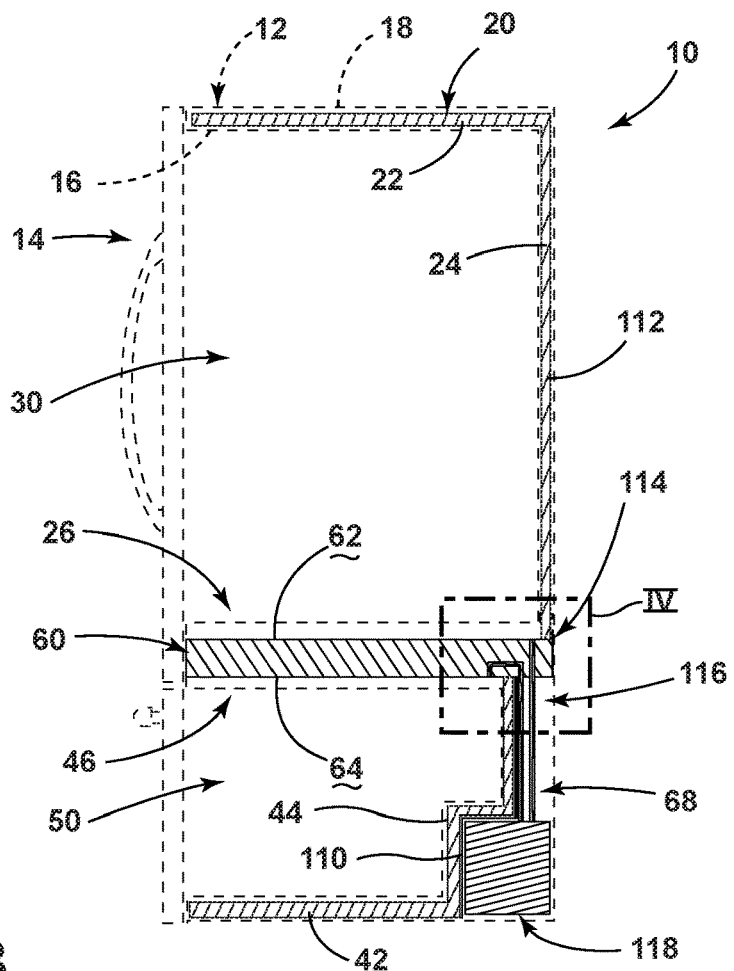
FIG. 3 is a cross-sectional view of the appliance of FIG. 1 taken along line III-III and illustrated with the doors in a closed position.
Figure 4:
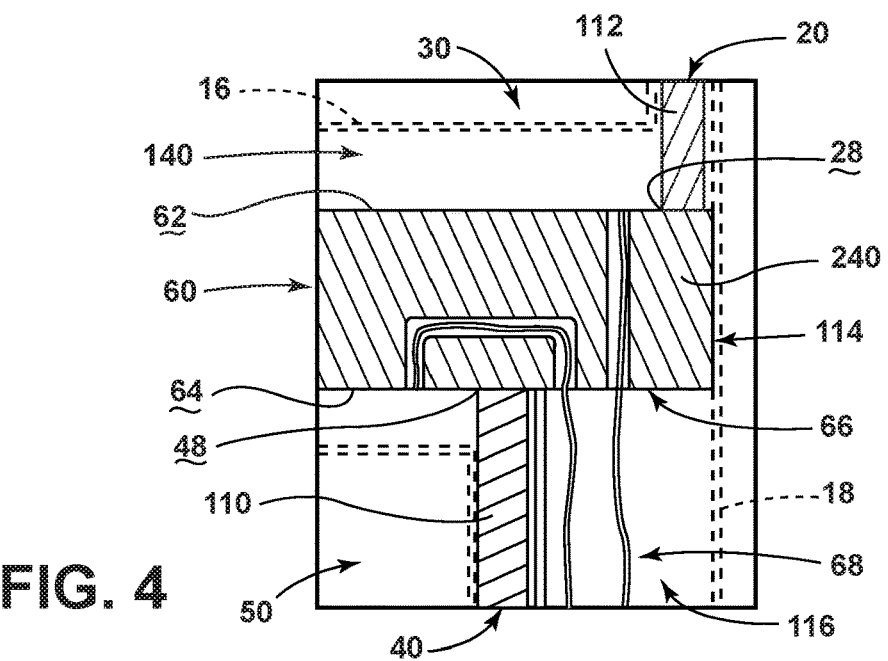
FIG. 4 is an enlarged cross-sectional view of the refrigerating appliance of FIG. 3 taken at area IV.

As exemplified in FIGS. 2-4, it is contemplated that portions of the first and second vacuum insulated structures 20, 40 proximate the interstitial space 116 and the utility spaces 140 can be at least partially protected through the use of a cover member 160 that extends over a portion of the first and/or second vacuum insulated structures 20, 40 to prevent damage to the first and second vacuum insulated structures 20, 40 that may affect the at least partial vacuum formed therein. Such a cover member 160 may be applied to prevent punctures of the barrier film 82 that might affect the insulated performance of the split hybrid insulation structure 10.

According to various alternate aspects of the disclosure, instead of the utility spaces 140 being incorporated between the inner liner 16 and portions of a split hybrid insulation structure 10, various components of utility systems 68 can be set within recesses 170 defined within or along the intermediate insulation structure 60. Accordingly, such recesses 170 can be placed in communication with the appliance utility path 66 such that components of the various utility systems 68 of the appliance 14 can be delivered to the recess 170 for operating the fixtures disposed therein. It is also contemplated that the various fixtures of the utility systems 68 of the appliance 14 that are disposed in the location of the intermediate insulation structure 60 can be positioned in a predetermined setting and the foam insulation of the intermediate insulation structure 60 can be sprayed or otherwise disposed around the various fixtures of the utility systems 68 of the appliance 14. In this manner, the intermediate insulation structure 60 with the various components of the utility systems 68 of the appliance 14 can be pre-made for installation within the split hybrid insulation structure 10 for manufacture within the desired appliance 14.

According to the various alternate aspects of the disclosure, a split hybrid insulation structure 10 can be used for various appliances 14 that can include, but are not limited to, refrigerators, coolers, freezers, warmers, ovens, cleaning appliances, electrical equipment, and other similar appliances 14. It is also contemplated that an appliance 14 incorporating an aspect of the split hybrid insulation structure 10 may have only a first insulated interior 30. It is also contemplated that such an appliance 14 may have more than first and second insulated interiors 30, 50.

Figure 6:
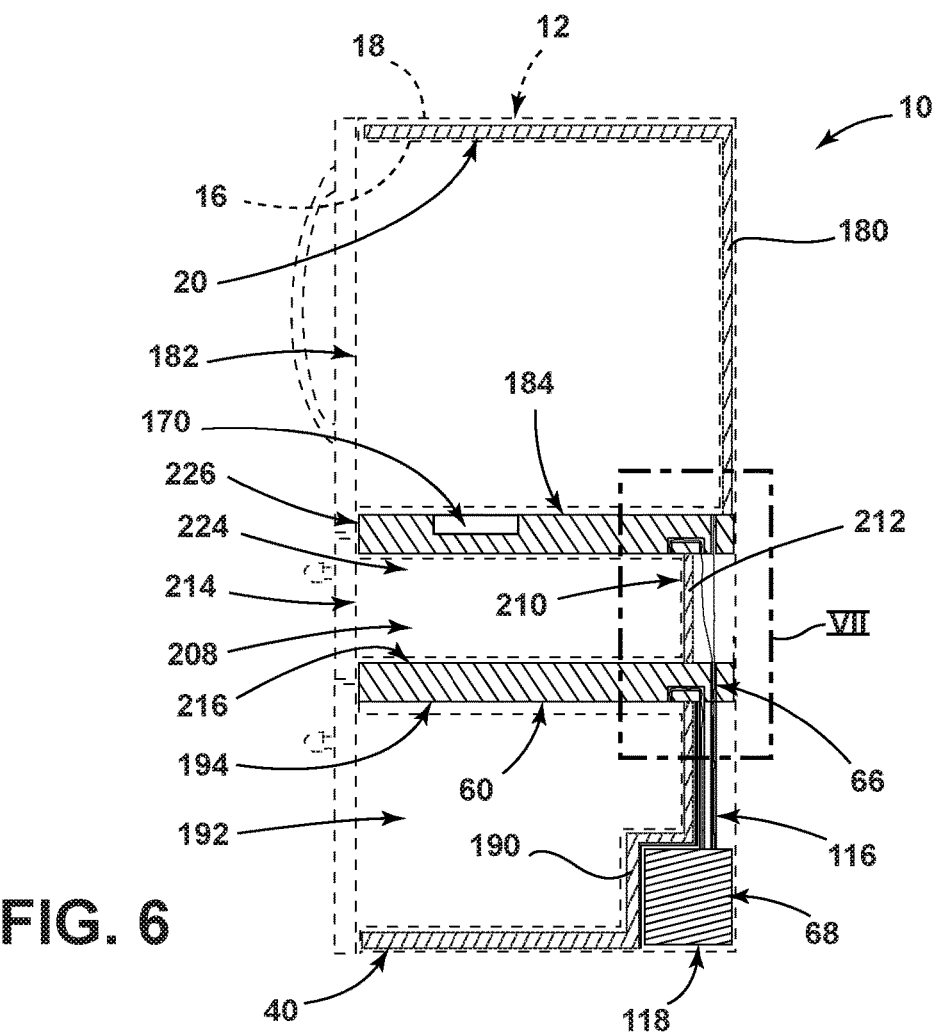
FIG. 6 is a cross-sectional view of an appliance incorporating an aspect of the split hybrid insulation structure and including a second intermediate insulation structure for defining a pantry compartment.
Figure 7:
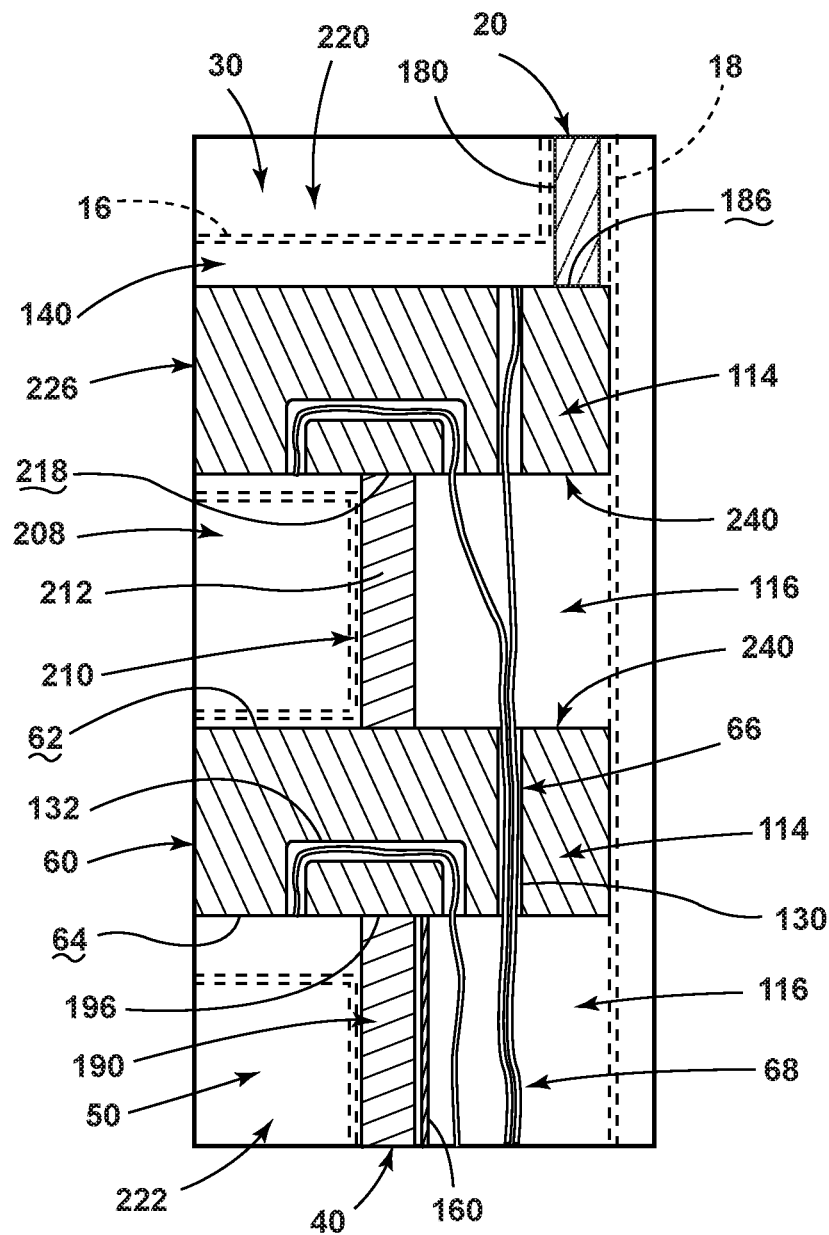
FIG. 7 is an enlarged cross-sectional view of the refrigerating appliance of FIG. 6 taken at area VII.
Figure 8:
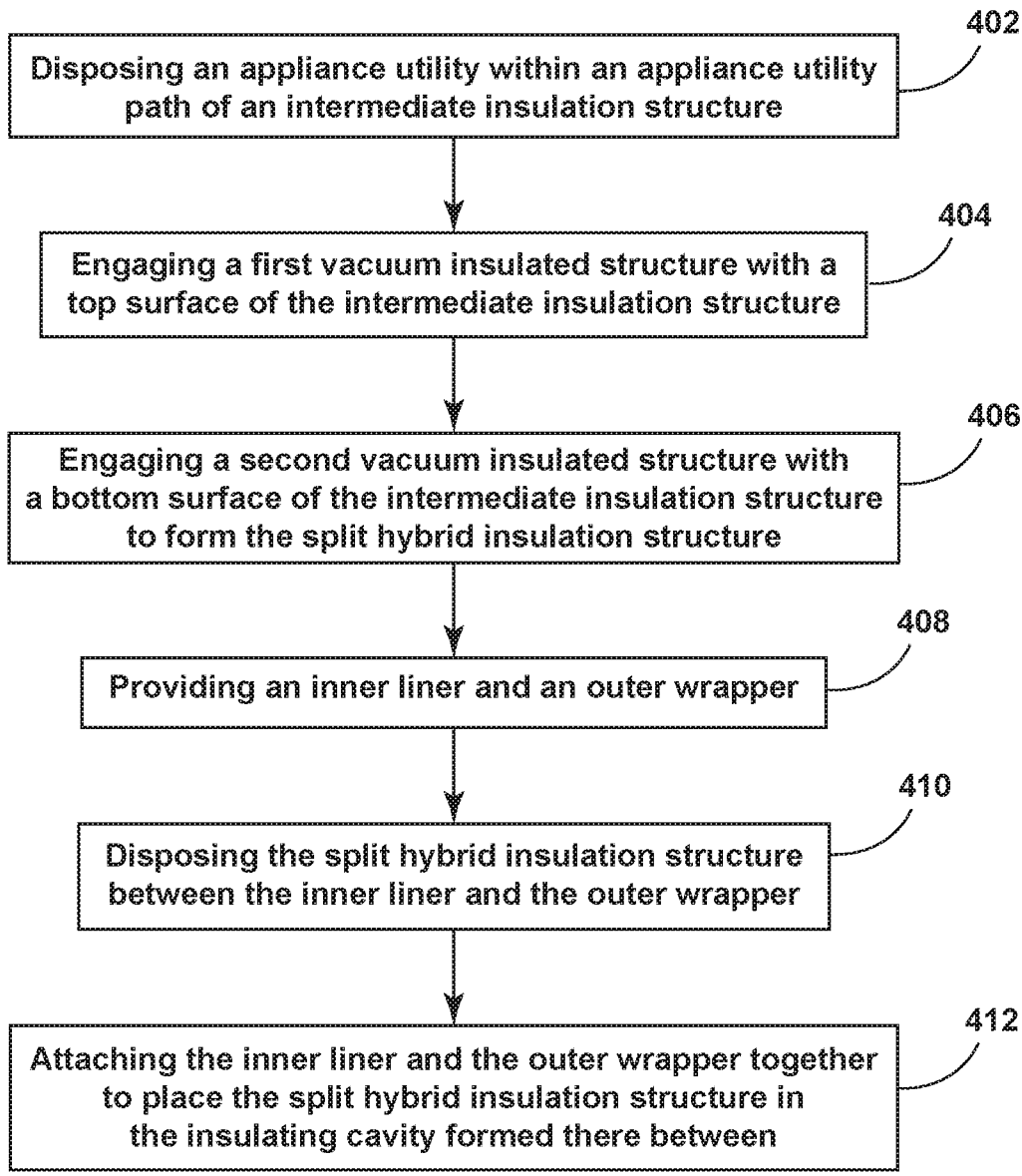
FIG. 8 is a schematic flow diagram illustrating a method for forming a split hybrid insulation structure for an appliance.

Referring now to FIGS. 6 and 7, an appliance 14 incorporating an aspect of the split hybrid insulation structure 10 can include a first vacuum insulated structure 20 having a plurality of continuous sides 180 that define an open front 182, an open end 184, and an engagement surface 186 proximate the open end 184. The continuous sides 180 of the first vacuum insulated structure 20 can at least partially define a first insulated interior 30. As discussed above, the plurality of continuous sides 180 of the first vacuum insulated structure 20 are configured to be free of internal apertures, or other punctures or openings, through the first vacuum insulated structure 20. The intermediate insulation structure 60 can include first and second surfaces that may correspond to the top and bottom surfaces 62, 64. One of the first and second surfaces is configured to receive the engagement surface 186 of the vacuum insulated structure to further define the first insulated interior 30. The intermediate insulation structure 60 can include the appliance utility path 66 within which at least one of the utility systems 68 for the appliance 14 can be disposed. The appliance utility path 66 is configured to be in communication with the first insulated interior 30 such that the utility systems 68 are delivered through the intermediate insulation structure 60 and not through the first vacuum insulated structure 20.

Referring again to FIGS. 6 and 7, it is contemplated that the split hybrid insulation structure 10 can include a second vacuum insulated structure 40 having a second plurality of continuous sides 190 that define a second open front 192 and a second open end 194 and a second engagement surface 196. The second plurality of continuous sides 190 of the second vacuum insulated structure 40 can be free of internal apertures, openings, and other punctures extending through the second vacuum insulated structure 40. The second engagement surface 196 of the second vacuum insulated structure 40 is configured to engage the other of the first and second surfaces of the intermediate insulation structure 60 to define a second insulated interior 50. As noted above, the first and second surfaces can correspond to the top and bottom surfaces 62, 64. As with the first insulated interior 30, the appliance utility path 66 is placed in communication with the second insulated interior 50.

It is also contemplated that a third vacuum insulated structure 210 having a third plurality of continuous sides 212, a third open front 214, at least one third open end 216 and at least one third engagement surface 218 can be disposed within the appliance 14. The first, second and third vacuum insulated structures 20, 40, 210 can define any one or more of a refrigerating compartment 220, freezing compartment 222 and a pantry compartment 224 within a refrigerating appliance. In such an aspect of the disclosure, a second intermediate insulation structure 226 can be disposed between the third vacuum insulated structure 210 and one of the first and second vacuum insulated structures 20, 40 to define a third insulated interior 208 that can define a pantry compartment 224 of the refrigerating appliance. It is also contemplated that each of the intermediate insulation structure 60 and the second intermediate insulation structure 226 can include a portion of the appliance utility path 66 for delivering various portions of the utility systems 68 of the appliance 14 to the first, second and third insulated interiors 30, 50, 208. In this manner, the first, second and third vacuum insulated structures 20, 40, 210 of the split hybrid insulation structure 10 can remain undisturbed or substantially undisturbed while the utility systems 68 of the appliance 14 are delivered through the intermediate insulation structure 60 and the second intermediate insulation structure 226.

It is contemplated that an area behind the third vacuum insulated structure 210 can also include a portion of the interstitial space 116 for housing at least a portion of utility systems 68 of the appliance 14, which can also provide for delivery of resources by the various utility systems 68 of the appliance 14 to the first, second and third insulated interiors 30, 50, 208. In this manner, a portion of the intermediate insulation structure 60 and/or the second intermediate insulation structure 226 can include an interstitial portion 240 that can define a boundary of the interstitial space 116. In such an aspect of the disclosure, the appliance utility path 66 can be in communication with the interstitial space 116 through the interstitial portion 240 of the intermediate insulation structure 60 and/or the second intermediate insulation structure 226.

According to the various alternate aspects of the disclosure, where the split hybrid insulation structure 10 is used within a refrigerating appliance, the refrigerating appliance can take the form of any one of several refrigerator configurations. Such configurations can include, but are not limited to, French door bottom mount, side-by-side, coffin, single cavity refrigerator, single cavity freezer, and other various multi-compartment configurations that can incorporate one or both of heating and cooling functions.

Referring now to FIG. 5, the intermediate insulation structure 60 of the split hybrid insulation structure 10 can include various configurations of the appliance utility path 66. The appliance utility path 66 can be one or more conduits that extend through the material of the intermediate insulation structure 60. It is also contemplated that the appliance utility path 66 can incorporate a cutout 250 from a portion of the intermediate insulation structure 60. Where a cutout 250 is implemented, various foam insulation material 80 can be used to fill in portions of the insulation cavity 12 defined between the outer wrapper 18 and the inner liner 16 to increase the insulating performance of the split hybrid insulation structure 10.

Referring now to FIGS. 1-4 and 8, having described the split hybrid insulation structure 10, a method is disclosed for forming a split hybrid insulation structure 10 for an appliance 14. This method 400 can include the step of disposing at least one utility system 68 within an appliance utility path 66 of the intermediate insulation structure 60 (step 402). By placing components of the utility systems 68 of the appliance 14 within the appliance utility path 66, before installing the first, second and/or third vacuum insulated structures 20, 40, 210, damage to the first, second and/or third vacuum insulated structures 20, 40, 210 may be minimized through the process of locating the positions of the components of the utility systems 68 prior to adding the vacuum insulated structures. The method can also include engaging the lower connection surface 28 of the first vacuum insulated structure 20 with the top surface 62 of the intermediate insulation structure 60 to define the first insulated interior 30 (step 404). In this manner, the first insulated interior 30 can be placed in communication with the appliance utility path 66 and one or more of the utility systems 68 of the appliance 14.

The upper connection surface 48 of the second vacuum insulated structure 40, according to the method 400, is also moved into engagement with the bottom surface 64 of the intermediate insulation structure 60 to define the second insulated interior 50 (step 406). As with the first insulated interior 30, the second insulated interior 50 is placed in communication with the appliance utility path 66 and at least one of the utility systems 68 of the appliance 14. It is contemplated that the engagement of the first and second vacuum insulated structures 20, 40 with the intermediate insulation structure 60 forms or substantially forms the split hybrid insulation structure 10.

According to various alternate aspects of the disclosure, it is contemplated that the one or more utility systems 68 of the appliance 14 can be installed through the intermediate insulation structure 60 after the first and second vacuum insulated structures 20, 40 are engaged with the intermediate insulation structure 60. The installation of the components of the utility systems 68 can be installed after formation of the split hybrid insulation structure 10 so long as substantial damage to the first and/or second vacuum insulated structures 20, 40 that may damage the vacuum formed therein or negatively affect the insulating performance of the structures can be avoided.

Referring again to FIGS. 1-4 and 8, the method 400 also includes providing an outer wrapper 18 and an inner liner 16 for the appliance 14 (step 408). It is contemplated that the split hybrid insulation structure 10 can be disposed between the inner liner 16 and the outer wrapper 18 (step 410). The method 400 also includes the step of connecting the inner liner 16 to the outer wrapper 18 to form the insulating cavity therebetween (step 412). In this manner, the split hybrid insulation structure 10 is disposed within the insulation cavity 12 and an interstitial space 116 can be defined between the first and/or second vacuum insulated structures 20, 40 in the outer wrapper 18. As discussed above, the interstitial space 116 can at least partially define the machine compartment 118 of the appliance 14.

What is claimed is:

1. A method for forming a split hybrid insulation structure for an appliance, the method including:
engaging a first engagement surface of a first vacuum insulated structure with one of first and second surfaces of an intermediate insulation structure to define a first insulated interior, wherein the first vacuum insulated structure includes a plurality of continuous sides that are free of internal apertures therethrough;
disposing at least one utility within an interstitial space at least partially defined by an outer surface of the first vacuum insulated structure, wherein the first vacuum insulated structure separates the first insulated interior from the interstitial space;
connecting the at least one utility to the first insulated interior via an appliance utility path that extends through the intermediate insulation structure and traverses around the first engagement surface of the first vacuum insulated structure, wherein a rear portion of the intermediate insulation structure includes an interstitial portion, wherein one of the first and second surfaces within the interstitial portion defines a boundary of the interstitial space, and wherein the appliance utility path communicates with the interstitial space through the interstitial portion of the intermediate insulation structure; and
disposing the at least one utility within the appliance utility path of the intermediate insulation structure.

2. The method of claim 1, further including a step of:
engaging a second vacuum insulated structure having a second plurality of continuous sides that are free of internal apertures therethrough, wherein a second engagement surface of the second vacuum insulated structure engages the other of the first and second surfaces of the intermediate insulation structure to define a second insulated interior, and wherein the appliance utility path places the interstitial space in communication with the second insulated interior via the intermediate insulation structure.

3. The method of claim 2, wherein the appliance utility path extends through the intermediate insulation structure and traverses around the second engagement surface of the second vacuum insulated structure.

4. The method of claim 2, wherein the appliance utility path includes a plurality of conduits that extends through portions of the intermediate insulation structure, wherein first and second conduits of the plurality of conduits are in communication with the first and second insulated interiors, respectively.

5. The method of claim 1, further including steps of:
disposing the first vacuum insulated structure and the intermediate insulation structure having the appliance utility path between an inner liner and an outer wrapper; and
connecting the inner liner to the outer wrapper to form an insulating cavity therebetween, wherein the first vacuum insulated structure and the intermediate insulation structure are disposed within the insulating cavity, and wherein the interstitial space is defined between the first vacuum insulated structure and the outer wrapper.

6. The method of claim 5, wherein the interstitial space at least partially defines a machine compartment.

7. The method of claim 6, wherein the interstitial space includes a cover member that at least partially separates the first vacuum insulated structure from the machine compartment, wherein a portion of the first vacuum insulated structure is disposed between the inner liner and the cover member.

8. The method of claim 5, wherein the intermediate insulation structure is defined by a foam insulation material that directly engages the first vacuum insulated structure and the inner liner.

9. The method of claim 1, wherein the appliance utility path includes at least one conduit that extends through portions of the intermediate insulation structure, wherein the at least one conduit is in communication with the first insulated interior, and wherein the first vacuum insulated structure is free of direct engagement with the appliance utility path.

10. The method of claim 1, wherein the intermediate insulation structure includes an internal mullion volume and an insulating material disposed within the internal mullion volume, and wherein the internal mullion volume is free of a vacuum.

11. The method of claim 10, wherein the insulating material is a foamed-in insulation, and wherein at least one of an ice maker and a water filter are disposed within the internal mullion volume and are at least partially surrounded by the foamed-in insulation.

12. A method for forming a split hybrid insulation structure for an appliance, the method including:
disposing an engagement surface of a vacuum insulated structure in direct engagement with an intermediate insulation structure to cooperatively define an insulated interior and separate an interstitial space from the insulated interior, wherein the vacuum insulated structure includes a plurality of continuous sides that are free of internal apertures therethrough;

disposing at least one utility conduit within the intermediate insulation structure and extending from the interstitial space to the insulated interior via an appliance utility path that extends from the interstitial space through the intermediate insulation structure and traverses around the engagement surface of the vacuum insulated structures;

disposing at least one utility within the interstitial space that is at least partially defined by an outer surface of the vacuum insulated structure, wherein the vacuum insulated structure separates the insulated interior from the interstitial space;

connecting the at least one utility to the insulated interior via the at least one utility conduit;

disposing the at least one utility within the at least one utility conduit of the intermediate insulation structure; and disposing the vacuum insulated structure and the intermediate insulation structure having the at least one utility conduit between an inner liner and an outer wrapper; and connecting the inner liner to the outer wrapper to form an insulating cavity therebetween, wherein the vacuum insulated structure and the intermediate insulation structure are disposed within the insulating cavity, and wherein the interstitial space is defined between the vacuum insulated structure and the outer wrapper.

13. The method of claim 12, wherein the interstitial space at least partially defines a machine compartment.

14. The method of claim 13, wherein the interstitial space includes a cover member that at least partially separates the vacuum insulated structure from the machine compartment, wherein a portion of the vacuum insulated structure is disposed between the inner liner and the cover member.

15. The method of claim 12, wherein the intermediate insulation structure is defined by a foam insulation material that directly engages the vacuum insulated structure and the inner liner.

16. A method for forming a split hybrid insulation structure for an appliance, the method including:

disposing an engagement surface of a vacuum insulated structure in direct engagement with an intermediate insulation structure to cooperatively define an insulated interior and separate an interstitial space from the insulated interior, wherein the vacuum insulated structure includes a plurality of continuous sides that are free of internal apertures therethrough;

disposing a utility conduit within the intermediate insulation structure, the utility conduit extending from the interstitial space to the insulated interior via an appliance utility path that extends from the interstitial space through the intermediate insulation structure and traverses around the engagement surface of the vacuum insulated structure, wherein the interstitial space is partially defined by a cover member that at least partially separates the vacuum insulated structure from the interstitial space;

disposing the vacuum insulated structure and the intermediate insulation structure having the utility conduit between an inner liner and an outer wrapper; and connecting the inner liner to the outer wrapper to form an insulating cavity therebetween, wherein the vacuum insulated structure and the intermediate insulation structure are disposed within the insulating cavity, and wherein the interstitial space is defined between the vacuum insulated structure and the outer wrapper.

* * * * *